United States Patent [19]

Nakao et al.

[11] Patent Number: 4,828,278
[45] Date of Patent: May 9, 1989

[54] SELF-SUPPORTING/MAINTAINING MECHANISM OF BABY CARRIAGE

[75] Inventors: Shinroku Nakao, Kanagawa; Takashi Ishikura; Yuuichi Arai, both of Tokyo, all of Japan

[73] Assignee: Combi Co., Ltd., Tokyo, Japan

[21] Appl. No.: 89,800

[22] Filed: Aug. 27, 1987

[30] Foreign Application Priority Data

Aug. 27, 1986 [JP] Japan .................. 61-129413

[51] Int. Cl.⁴ ............................... B62B 7/08
[52] U.S. Cl. ..................... 280/644; 280/650; 280/658; 280/47.38; 403/93; 403/100
[58] Field of Search ........... 280/642, 644, 647, 650, 280/658, 47.37 R, 47.38, 643; 403/93, 100

[56] References Cited

U.S. PATENT DOCUMENTS

| | | | |
|---|---|---|---|
| 2,063,242 | 12/1936 | Graser | 403/315 |
| 2,286,655 | 6/1942 | Supnick | 403/100 |
| 4,216,974 | 8/1980 | Kassai | 280/650 |
| 4,317,581 | 3/1982 | Kassai | 280/658 |
| 4,428,598 | 1/1984 | Kassai | 280/650 |
| 4,616,844 | 10/1986 | Kassai | 280/658 |
| 4,697,823 | 10/1987 | Kassai | 280/644 |
| 4,706,986 | 11/1987 | Kassai | 280/647 X |

FOREIGN PATENT DOCUMENTS

| | | | |
|---|---|---|---|
| 56-25980 | 6/1981 | Japan | 280/644 |
| 1275052 | 5/1972 | United Kingdom | 280/647 |

Primary Examiner—David M. Mitchell
Assistant Examiner—Brian L. Johnson
Attorney, Agent, or Firm—Sughrue, Mion, Zinn, Macpeak & Seas

[57] ABSTRACT

A stoppage-maintaining device for maintaining a baby carriage either in a folded or an unfolded state. The handle bar is pivotally connected to a rear leg by a pivoting stoppage-maintaining bar. The stoppage-maintaining bar has two concave grooves on two surfaces which are alternately engageable, as the bar rotates, with a protrusion on an upper end of a stopper sliding on the rear leg. Also, extending upwardly from the stopper is an engagement plate which, when overlapped with an elastic plate on the rear leg, prevents the rotation of the stoppage-maintaining bar from its unfolded state. The engagement plate is biased toward the elastic plate.

5 Claims, 7 Drawing Sheets

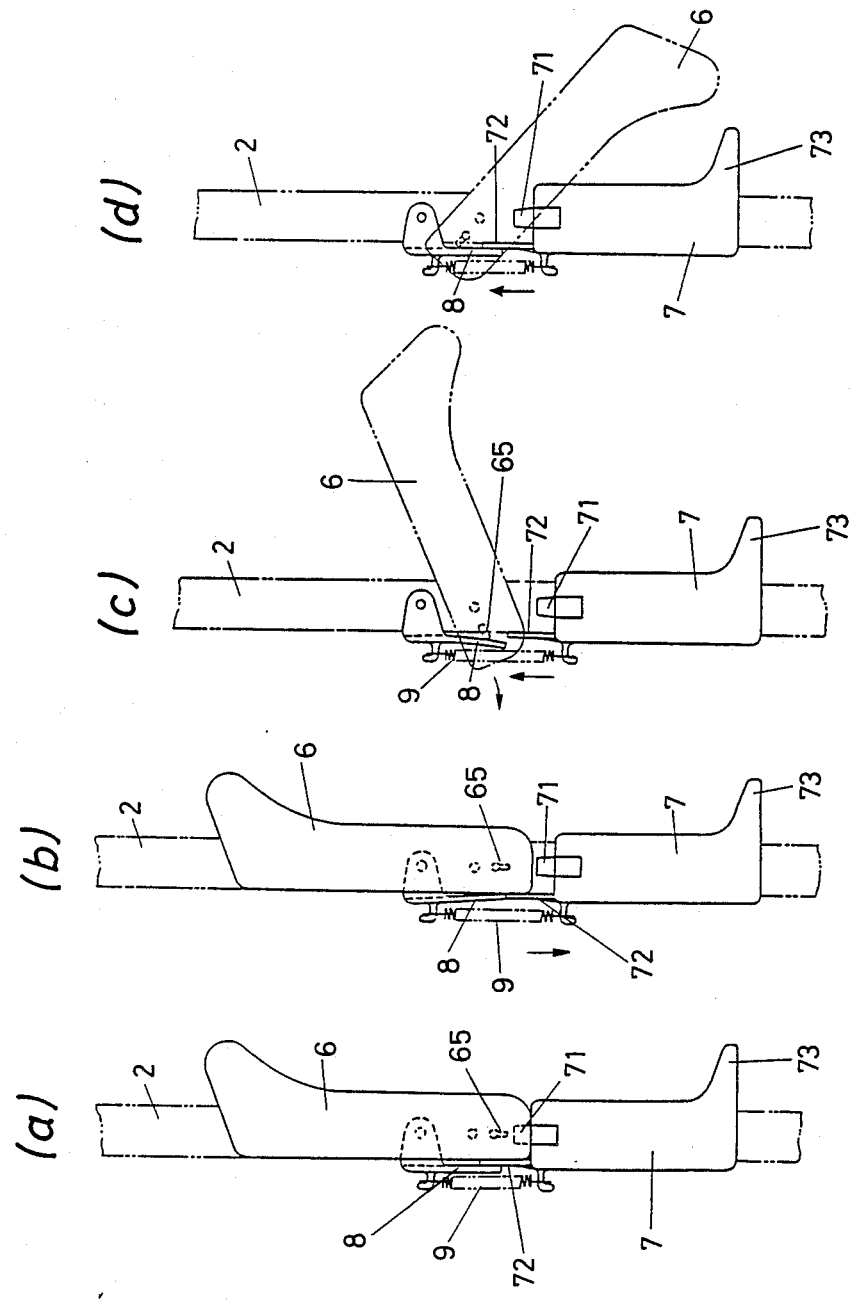

SELF-SUPPORTING/MAINTAINING MECHANISM OF BABY CARRIAGE

BACKGROUND OF THE INVENTION

1. Field of the Invention

The present invention generally relates to a stroller or baby carriage for transporting or carrying a baby. It particularly relates to a mechanism for self-supporting and self-maintaining a folded body of a baby carriage when the body is folded up so to be stored in the folded state.

2. Background of the Invention

Taking a baby or an infant out in the open air for a walk or for sun-bathing is necessary for the baby or infant to grow up healthy. It is, however, very uncomfortable for a guardian of the baby or infant to hold or carry the baby or infant in the arms or on the back, respectively, of the parent for a long time on one hand. On the other hand, it is never desirable, for a growing baby or infant, to be kept in a rigid posture for a long time.

To eliminate those inconveniences, baby carriages have been developed and a number of excellent improvements have so far been worked out in those baby carriages.

Those baby carriages for carrying babies, as represented by bassinets, were intended as their initial main object to carry babies while laid on their side in the baby carriages. Carriages were then developed so that babies can be carried as if they are sitting on a chair.

Through those improvements, the baby carriages have also been so designed as to be portable to thereby make it possible to carry the baby carriages into public traffic systems such as a subway. The baby carriages which had been used merely near the home have thus been made available for outings over a long distance.

Though the folding mechanism of a baby carriage as mentioned above is advantageous also from the viewpoint of saving household storage space for the baby carriage, the folding mechanism is sometimes subject to an accident where the folded state of the baby carriage changes its expanded or unfolded state unexpectedly due to mechanical vibrations or other mild shocks.

It is our daily and frequent experience that such an accident as described above occurs particularly remarkable in traffic vehicles continuously accompanied by vibrations, such as a bus. A quick solution of this problem stands required in the field of baby carriages.

A specific arrangement of a known baby carriage will be described hereunder with reference FIGS. 1 to 3 which, in fact, primarily illustrate the baby carriage of the present invention. In the conventional baby carriage, a stopper S for maintaining a self-supporting mechanism is interposed between the upper end of a stoppage-maintaining bar 6 and the lower end of a handle bar 3. By the engagement between the stopper S and the stoppage-maintaining bar 6 the interconnection between the stoppage-maintaining bar 6 and the handle bar 3 is fixed substantially in an inverted L-shape in side view. Thus, the folding operation is made impossible while the fixed, unfolded state thus made is maintained. When folding up the baby carriage, the fixed state is released by disengaging the interlock between the stopper S and the stoppage-maintaining bar 6 to thereby enable the whole of the baby carriage to be folded up.

A prior art reference which discloses another example of a known arrangement in which the stopper mechanism is so arranged as to be linked with the upper end of a stoppage-maintaining plate, is Japanese Utility Model Publication No. 25980/1981.

It has however been pointed out that these known arrangements have such disadvantages as follows.

Since the position of the stopper mechanism S is too high, when a parcel basket 10 is folded up (refer to FIG. 2), the folded parcel basket 10 overlaps a frame 101 which supports the parcel basket 10 to thereby make it difficult to carry out the operation of releasing the interlock between the stoppage-maintaining bar 6 and the stopper S. Further, there is a danger that fingers of the baby or the user can enter between the handle bar 3 and the frame 101, or the like.

There is another danger that erroneous releasing of the stopper S may be carried out by folding of the parcel basket 10.

Furthermore, since the parcel basket 10 has a large volume, there is a further danger that the stopper S may be erroneously released by mistake when articles are placed into or taken out of the parcel basket 10.

SUMMARY OF THE INVENTION

To cope with those problems, it is an object of the present invention to provide a self-supporting and self-maintaining mechanism for a baby carriage in which, when the baby carriage is folded up, the self-supporting and self-maintaining mechanism attached on a rear leg bar is automatically actuated and interlocked during the operation of folding a body of the baby carriage to operate a stopper for assuredly maintaining the folded state.

It is another object of the present invention to provide a self-supporting and self-maintaining mechanism for a baby carriage in which the above-mentioned supporting and maintaining mechanism is automatically restored to maintain the carriage in the unfolded state, when the baby carriage is unfolded.

The present invention is characterized in that the baby carriage is arranged in such a manner that a stoppage-maintaining bar attached on a base end of a handle bar moves a stopper attached to a rear leg bar vertically automatically in response to a folding operation of a rear leg bar, and a handle bar which constitute a body of the baby carriage body thereby causing the stopper to engage the stoppage-maintaining bar so as to correctly maintain the unfolded of the carriage or folded state.

BRIEF DESCRIPTION OF THE DRAWINGS

The following drawings illustrate an embodiment of the present invention.

FIGS. 7(a) through 7(d) are partial side views showing the engagement relation between the stoppage-maintaining plate and the elastic plate. FIG. 7(a) shows the unfolded state; FIG. 7(b) shows the state where the stopper is temporarily pulled down; FIG. 7(c) shows the midpoint of the folding operation; and FIG. 7(d) shows the state when the folding operation ends.

DETAILED DESCRIPTION OF THE PREFERRED EMBODIMENTS

Referring to the accompanying drawings, an embodiment of the present invention will be described hereunder.

Figure 1:
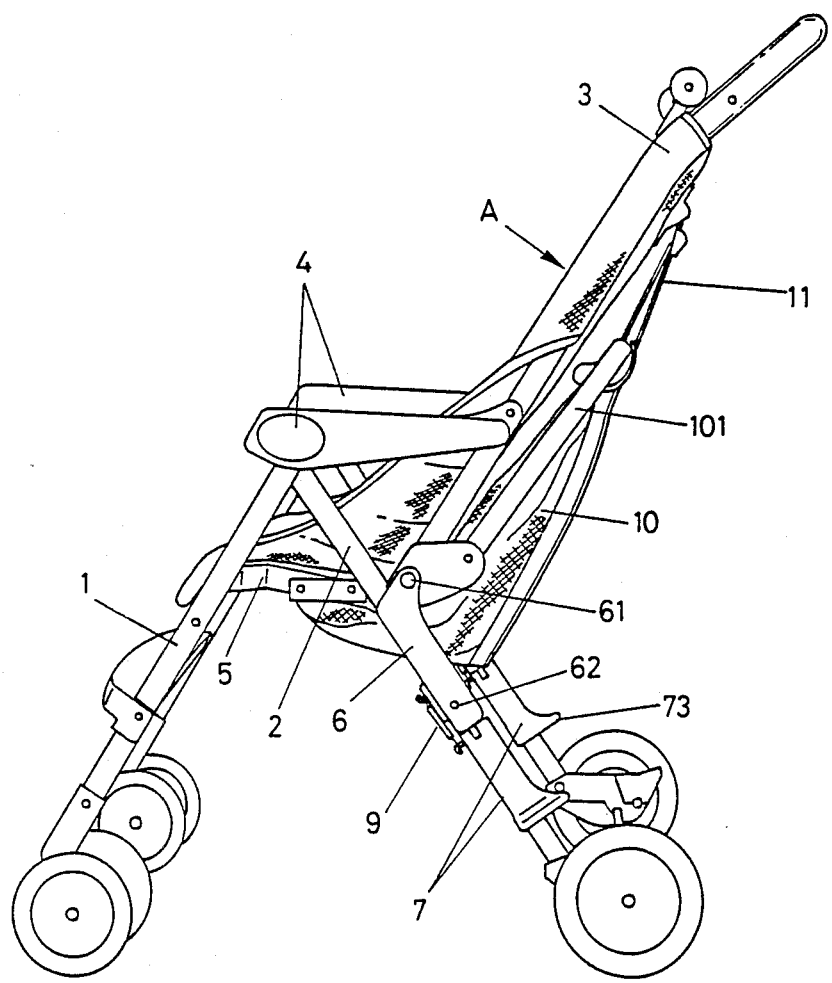
FIG. 1 is a side perspective view of a carriage showing the state in use with the parcel basket in the unfolded state. This figure is also used to describe a conventional folding mechanism.
Figure 2:
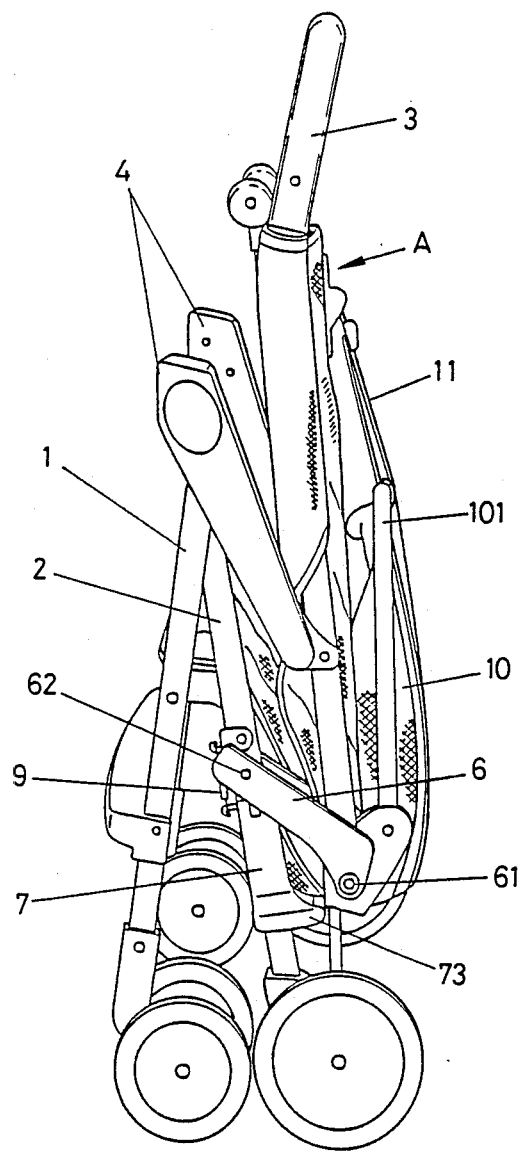
FIG. 2 is a side view showing the carriage in the folded state.
Figure 3:
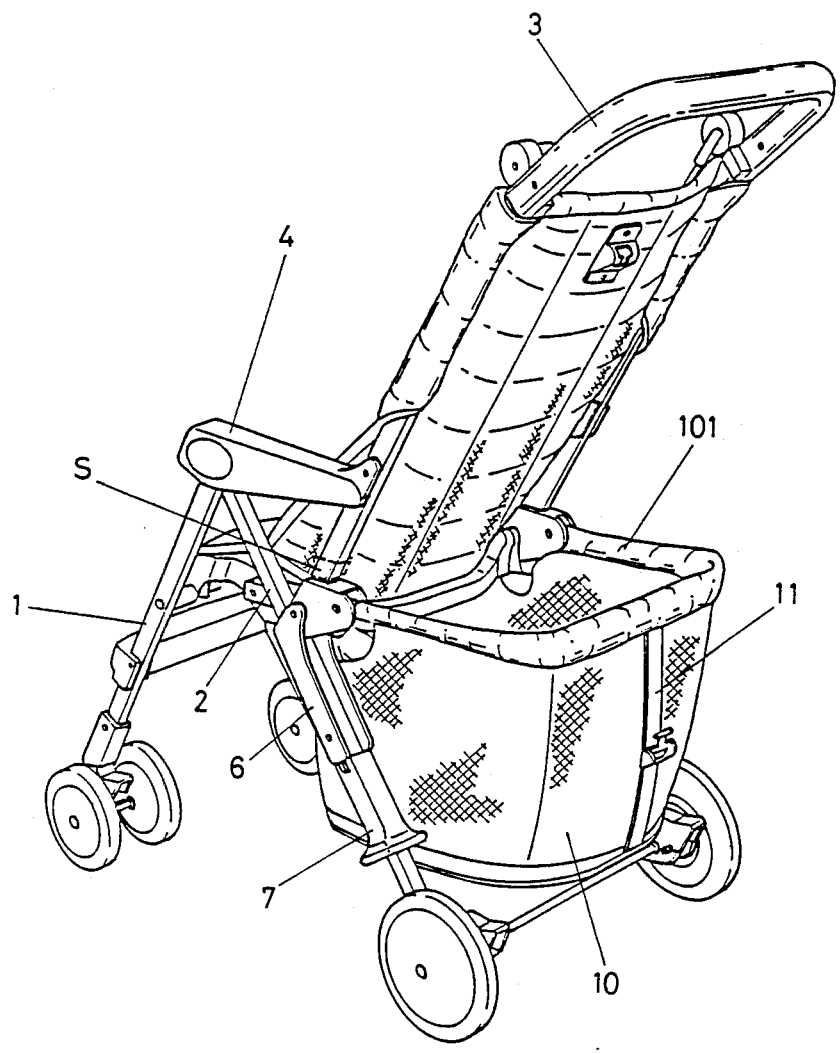
FIG. 3 is a side view showing the carriage in the unfolded state.
Figure 4:
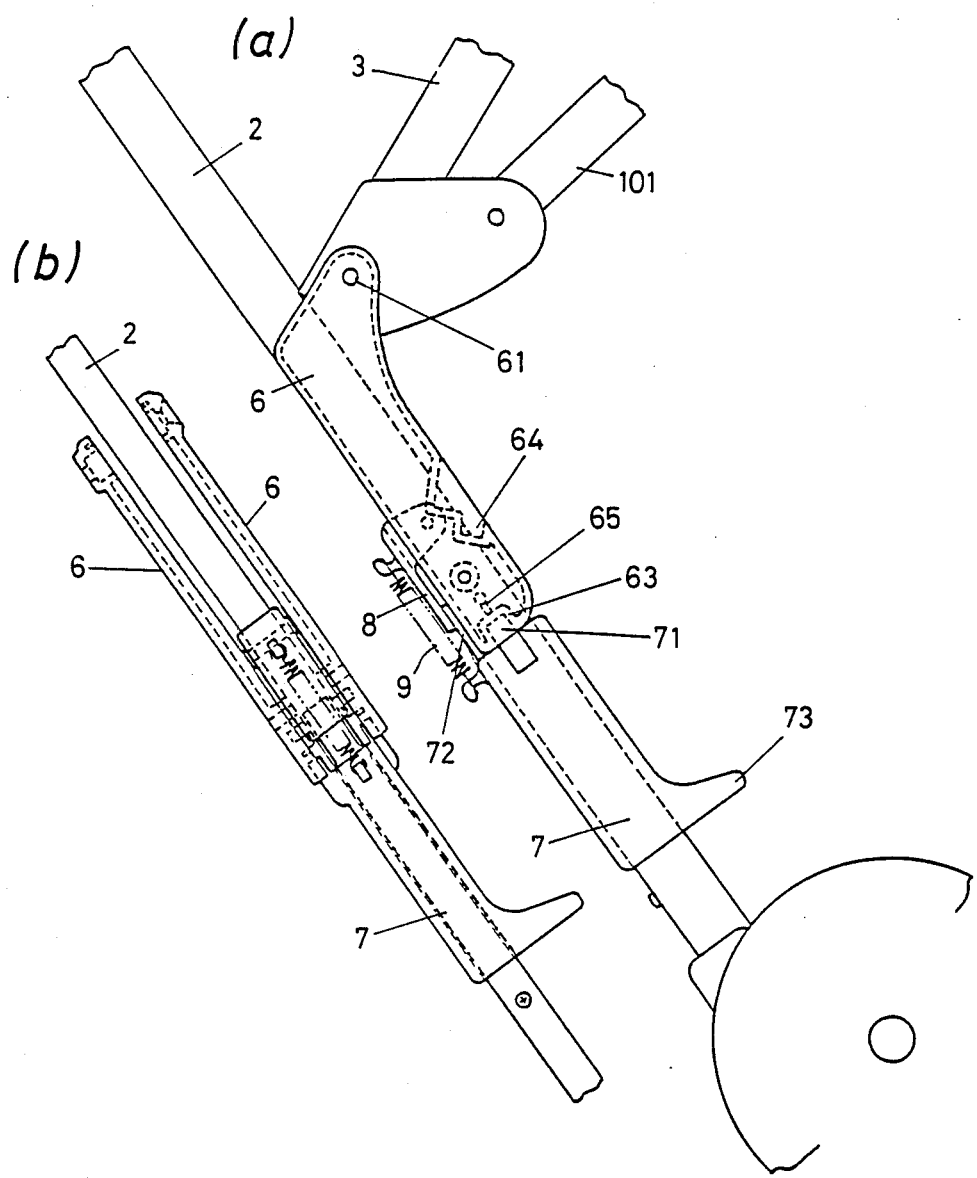
FIG. 4(a) shows a side view and FIG. 4(b) shows a front view of the main part of the invention in the state of FIG. 2.

In a baby carriage generally designated by A in FIGS. 1, 2 and 3, front leg bars 1, rear leg bars 2, a handle bar 3 and armrest bars 4 are foldably coupled and assembled to constitute a body of the baby carriage. A seat 5 is attached to the front leg bars 1 and the rear leg bars 2. The respective front leg bar 1 and the corresponding rear leg bar 2 are connected together at their respective upper ends and are pivotally attached to the forward end of the corresponding armrest bar 4. The rear ends of the respective armrest bars 4 are pivotally attached at longitudinally middle portions of the handle bar 3. The handle bar 3 has its base end portions pivotally attached at longitudinally middle portions of the respective rear leg bars 2 so as to enable the folding operation to be carried out. Stoppage-maintaining bars 6 have respective upper ends pivotally attached at upper pivots 61 to the respective lower ends of the handle bar 3, each of the stoppage-maintaining bars 6 is substantially L-shaped in side view. The respective lower ends of the stoppage-maintaining bars 6 are pivotally attached at lower pivots 62 to longitudinally middle portions of the respective rear leg bars 2 so that the stoppage-maintaining bars 6 are vertically movable. Each of the stoppage-maintaining bars 6 is constituted, as best shown in FIG. 4(b), by a pair of thin plate members attached to the corresponding rear leg bar 2 so as to sandwich the rear leg bar 2 therebetween. The lower end and rear face of the respective plate members (right side in FIGS. 2 and 4(a)) have concave engagement-stopper grooves 63 and 64 into which engagement-stopper protrusion 71 projecting from the upper end portions of the stopper 7 is alternatively fitted. A start protrusion 65 projects from the lowermost inside of the respective stoppage-maintaining bar 6 for raising up an elastic plate 8 attached on the respective rear leg bar 2.

The above-mentioned engagement-stopper concave grooves 63 and 64 formed in the respective stoppage-maintaining bar 6 so function together with the engagement-stopper protrusion 71 that the engagement-stopper concave groove 63 provided on the lower end can maintain the unfolded state of the baby carriage, while the engagement-stopper concave groove 64 provided on the rear face (right side in FIGS. 2 and 4(a)) should maintain the folded state of the baby carriage.

The respective stopper 7 is constituted by a square tubular body so arranged as to house the corresponding rear leg bar 2 therein. The tubular body of the stopper 7 is attached slidably up and down at a portion near the lower end of the corresponding rear leg bar 2. A stoppage-maintaining plate 72 maintains the lowered state of the stopper 7 when the stopper 7 is temporarily lowered. This stoppage-maintaining plate is formed at the upper end of stopper 7 on a side different from the side where the engagement-stopper protrusion 71 is provided. The stoppage-maintaining plate 72 is of a length so as to be a little longer than the engagement-stopper protrusion 71.

As shown in FIGS. 4(a) and 7(a), the elastic plate 8 is attached to the rear leg bar 2 so as to make the lower end of the elastic plate 8 face and cover the upper end face of the stoppage-maintaining plate 72 in such a manner that the lower end of the elastic plate 8 and the forward end portion of the stoppage-maintaining plate 72 overlap a little with each other when the baby carriage is in its unfolded state. The bottom end of the elastic plate 8 is intended to come into contact with the forward end of the stoppage-maintaining plate 72 when the stoppage-maintaining plate 72 is temporarily lowered, to thereby cooperate with the foward end of the stoppage-maintaining plate 72 to maintain the stoppage of the stoppage-maintaining plate 72.

A spring 9 is attached between the elastic plate 8 and a part of the stopper 7 adjacent the stoppage-maintaining plate 72 so as to maintain its contracting force to thereby normally pull up the stopper 7.

A collar-like expanded portion 73 is formed at the lower end part of the stopper 7 and is useful when the stopper 7 is depressed by a foot when the baby carriage is in the unfolded state. Though the formation of this collar-like expanded portion 73 is not an essential part of the present invention because the stopper 7 can be depressed by hand, the collar-like expanded portion 73 useful in that it allows a release operation to be carried out by foot.

A parcel basket 10 is arranged to be hung on the frame 101 on the lower face of the seat 5 in such a manner that when an engagement-stopper band 11 that is locked at an upper rear of the seat back is released the parcel basket 10 is unfolded into the form of a relatively large cubic box-like container.

The present invention thus arranged functions as follows.

(1) In the case where the baby carriage has been unfolded.

The unfolded state of the baby carriage is defined as the state which is illustrated in FIG. 3. In this case the respective stoppage-maintaining bar 6 attached at the corresponding lower end of the handle bar 3 runs parallel to the corresponding rear leg bar 2 to grasp the rear leg bar 2 from its opposite sides.

In this state, the engagement-stopper protrusion 71 provided on the upper end of the respective stopper 7 is fitted in the concave groove 63 formed in the lower end of the stoppage-maintaining bar 6 (FIGS. 4(a) and 7(a)). Thus, swinging of the stoppage-maintaining bar 6 is completely restricted. The baby carriage thus unfolded can be securely and firmly maintained in this unfolded state unless the stoppage-maintaining bar 6 is moved. Accordingly, there is no such a danger that the unfolded state is unexpectedly released.

(2) In the case where the baby carriage A is folded up.

When the baby carriage is to be folded, first the stopper 7 of the rear leg bar 2 as illustrated in FIGS. 2 and 7(a) is lowered against the force of the spring 9. More specifically, the collar-like expanded portion 73 formed on the lower end of the stopper is depressed by a foot.

Figure 5:
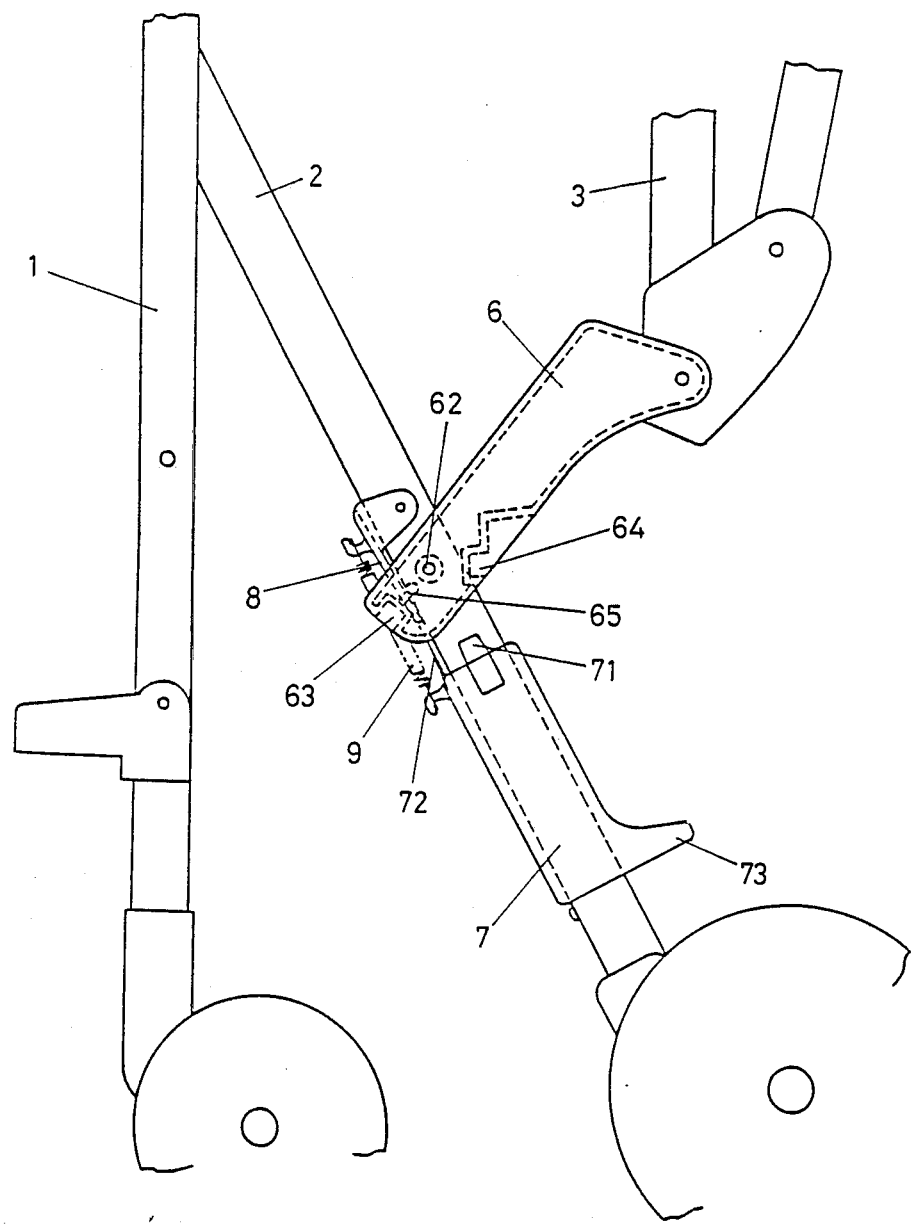
FIG. 5 is a partial enlarged side view showing the main part of the invention for starting the folding operation.

Thus, as shown in FIGS. 5 and 7(b), the interlocking between the engagement-stopper protrusion 71 provided on the upper end of the stopper 7 and the concave groove 63 of the stoppage-maintaining bar 6 is released as the stopper 7 moves down. At the same time, the stoppage maintaining plate 72 and the elastic plate 8 which have been so far overlapped with each other are released from this overlapped state so that the respective ends of both the plates 8 and 72 come into contact with each other as the spring 9 again biases the stopper 7 upwards and rotates the elastic plate 8 inward.

In such a state as described above, the stoppage-maintaining bar 6 becomes free from all interlocking so as to be released from the stoppage state to thus be enabled to swing.

If the upper end of the handle bar 3 is swung forward to fold the baby carriage under these conditions, as shown in FIGS. 5 and 7(c), the upper end of the stoppage-maintaining bar 6 swings down arcuately about the pivot 62.

Figure 6:
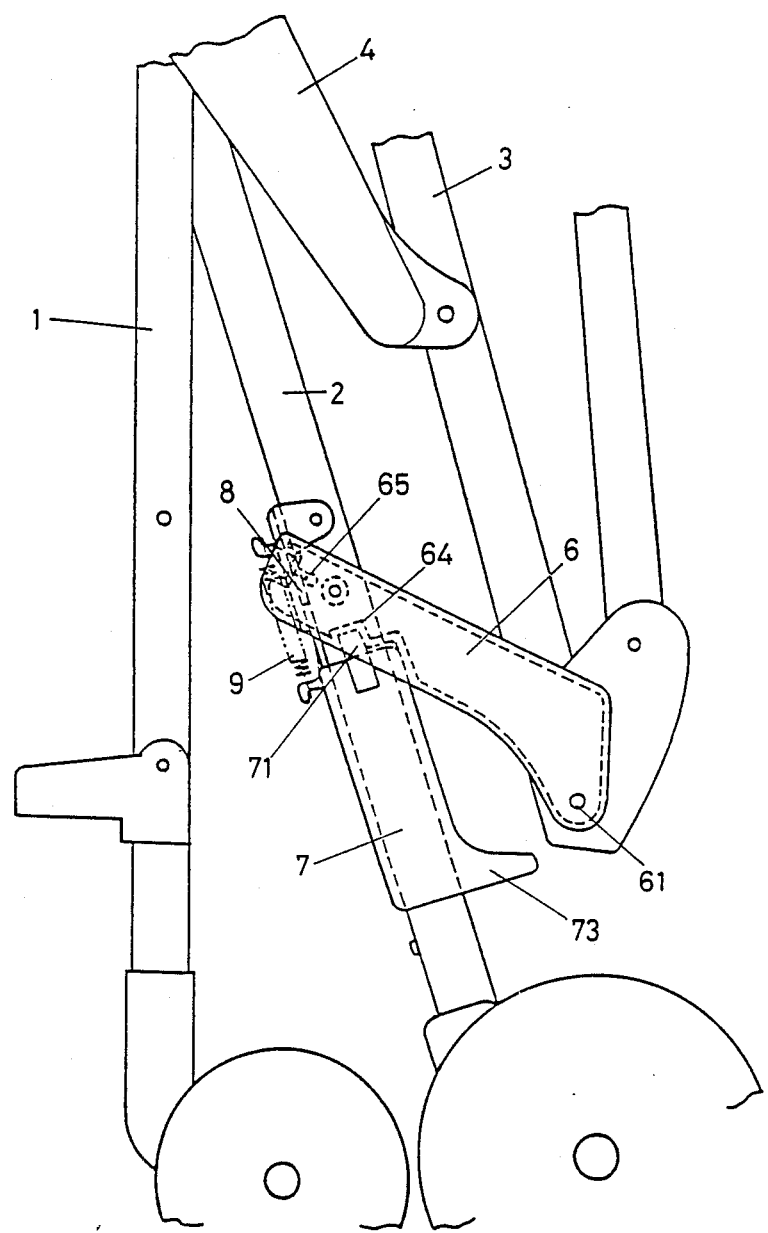
FIG. 6 is an enlarged side view showing the main part of the invention at the end of the folding operation.

Along with this swinging motion, the start protrusion 65 provided on the lowermost inside end of the stoppage-maintaining bar 6 operates to raise the rear surface of the elastic plate 8, so that the contact engagement between the respective ends of the elastic plate 8 and the stoppage-maintaining plate 72 is, as shown in FIGS. 3, 6 and 7(d), instantaneously released and the stopper 7 is raised by the force of the spring 9.

With the upward motion of the stopper 7, the engagement-stopper protrusion 71 provided on the upper end of the stopper 7 engages with the concave groove 64 formed in the rear side of the stoppage-maintaining bar 6, and the engagement therebetween is firmly maintained. The baby carriage thus folded cannot be unfolded unless the interlocking between the stoppage-maintaining bar 6 and the stopper 7 is released. Thus, the safety of the baby carriage is assured in the extreme.

(3) When the baby carriage is to be unfolded.

When the baby carriage in the folded state as illustrated in FIG. 2 is to be unfolded, the interlock between the protrusion 71 formed on the end of the stopper 7 and the concave groove 64 formed in the rear face of the stoppage-maintaining bar 6 is terminated by depressing the stopper 7 by foot.

The above-mentioned operation removes all the restrictions on pivotal movement at any portions of the body so that all the mechanisms can be freely operated so as to rapidly complete the unfolding of the baby carriage.

Further, when the unfolding is carried out through the operation of the members constituting the baby carriage, the stoppage-maintaining bar 6 swings about the pivot 62 so that the foward end thereof is raised. As a result, the engagement-stopper protrusion 71 formed on the end of the stopper 7 engages with the concave groove 63 formed in the lower end of the stoppage-maintaining bar 6 so that the unfolded state is firmly maintained.

Since the baby carriage according to the present invention is arranged in such a manner as described above, not only all the defects peculiar to the above-mentioned known structures are eliminated, but both the folded and unfolded states of the baby carriage can be firmly maintained. Accordingly, the baby carriage is extremely safe and it is possible to completely prevent an unexpected accident where the folded baby carriage is unexpectedly unfolded while carrying the same or in transporting the same in the self-supported state in a streetcar.

According to the present invention, various operations, in particular, the operation of the stoppage and maintaining mechanism for maintaining the unfolded state as well as the folded state can be automatically performed in response to the folding operation of the baby carriage. Accordingly, the present invention has such a meritorious effect that the baby carriage can be extremely easily handled even by a person having little mechanical knowledge.

In the case where the collar-like expanded portion 73 is formed on the lower end of the stopper 7 according to the present invention, the invention has a feature such that all the necessary operations can be performed simply and solely by a foot depressing operation on the collar-like expanded portion. Accordingly, all the necessary operations can be easily carried out only through the depressing operation by a foot, while holding a baby in the user's arms or even in the case where both the user's hands are full.

What is claimed is:

1. A baby carriage comprising:
    a seat structure;
    a pair of front leg bars;
    a pair of armrest bars;
    a pair of rear leg bars pivotably attached to upper ends of said front leg bars at the front ends of said armrest bars, and extending downwardly and rearwardly from said seat structure;
    a handle bar to which the rear ends of said armrest bars are pivotably mounted, said handle bar extending upwardly and rearwardly from said seat structure;
    at least one stoppage-maintaining bar swingably attached at a pivot point above a first end thereof to one of said rear leg bars and at a second end to said handle bar, said stoppage-maintaining bar having at least one concave groove formed therein; and
    at least one stopper slidably mounted on said one rear leg bar for movement in an axial direction of said rear leg bar along said rear leg bar and having an upper end surface and an engagement-stopper protrusion formed on said upper end surface thereof engageable with said at least one concave groove;
    said pair of front legs, said pair of rear legs, said pair of armrests, said handle bar, and said at least one stoppage-maintaining bar being pivotable relative to one another so that said baby carriage may be in one of a folded state and an unfolded state;
    wherein an elastic plate is attached to said rear leg bar above said stopper upper end surface;
    wherein a stoppage-maintaining plate is attached on said upper end surface of said stopper, said stoppage-maintaining plate extending further toward said stoppage-maintaining bar than said engagement-stopper protrusion such that said stoppage-maintaining plate is overlapped by said elastic plate; and
    wherein when said stopper is moved axially along said rear leg away from said seat structure, an edge of said elastic plate facing said upper end surface of said stopper and an edge of said stoppage-maintaining plate projecting away from said upper end surface of said stopper contact one another and maintain said stopper and said stoppage-maintaining bar a fixed distance from one another so that said engagement-stopper protrusion is disengaged from said at least one concave groove.

2. A baby carriage as recited in claim 1, further comprising spring means for biasing said elastic plate and said stopper toward each other.

3. A baby carriage as recited in claim 1, wherein said at least one stoppage-maintaining bar has a first concave groove formed in said first end portion and a second concave groove formed in a side of said at least one stoppage-maintaining bar adjacent said pivot point.

4. A baby carriage a recited in claim 3, further comprising spring means for biasing said elastic plate and said stopper toward each other.

5. A baby carriage as recited in claim 1, further comprising means for biasing said engagement-stopper protrusion into said at least one concave groove during said folded state.

* * * * *